United States Patent

Mossi et al.

[11] Patent Number: 5,498,029
[45] Date of Patent: Mar. 12, 1996

[54] TOOTHED INFLATOR ADAPTER FOR AN AIRBAG ASSEMBLY

[75] Inventors: G. Dean Mossi, Roy; Bryan P. Crowell, Hooper, both of Utah

[73] Assignee: Morton International, Inc., Chicago, Ill.

[21] Appl. No.: 375,355

[22] Filed: Jan. 19, 1995

[51] Int. Cl.⁶ .................................................. B60R 21/28
[52] U.S. Cl. ................ 280/741; 280/728.2; 280/732; 403/11
[58] Field of Search ....................... 280/728.2, 728.1, 280/732, 736, 741; 403/11

[56] References Cited

U.S. PATENT DOCUMENTS

| | | | |
|---|---|---|---|
| 4,913,461 | 4/1990 | Cuevas | 280/731 |
| 4,988,119 | 1/1991 | Hartmeyer | 280/743 |
| 5,069,480 | 12/1991 | Good | 280/743 |
| 5,141,247 | 8/1992 | Barth | 280/728 |
| 5,152,549 | 10/1992 | Aird | 280/728 |
| 5,197,756 | 3/1993 | Jarboe et al. | 280/728 |
| 5,342,084 | 8/1994 | Rose et al. | 280/728 A |
| 5,356,175 | 10/1994 | Rose et al. | 280/728.2 |

FOREIGN PATENT DOCUMENTS

| | | | |
|---|---|---|---|
| 815530 | 10/1951 | Germany . | |
| 1-160756 | 6/1989 | Japan | B60R 21/20 |
| 1-160757 | 6/1989 | Japan | B60R 21/20 |

*Primary Examiner*—Eric D. Culbreth
*Attorney, Agent, or Firm*—George W. Rauchfuss, Jr.; Gerald K. White

[57] ABSTRACT

An inflator adapter is provided for mounting a generally cylindrical inflator in an airbag module. The adapter has a hollow cylindrical shape with an inside diameter slightly larger than the outside diameter of the inflator being mounted therein. The adapter contains a plurality of internal inwardly protruding teeth located around the circumference of one end thereof. When the adapter is pressed on to the inflator, the inwardly facing teeth bite into the exterior of the inflator, thereby mechanically locking the adapter onto the inflator which is then mounted in the airbag module.

20 Claims, 3 Drawing Sheets

TOOTHED INFLATOR ADAPTER FOR AN AIRBAG ASSEMBLY

FIELD OF THE INVENTION

This invention relates to vehicle airbag restraint systems, and more particularly, to an inflator adapter for mounting an inflator in an airbag module.

BACKGROUND OF THE INVENTION

A vehicular airbag restraint system generally includes a pyrotechnic inflator which may comprise a cylindrical housing which encloses some form of gas generating material which, when ignited, generates a non-toxic inert gas under pressure within the housing. The inflator, along with an uninflated, folded airbag, which is to be inflated by the gas, are disposed in an internal cavity of an airbag assembly along with means to control deployment. If a situation calling for actuation of the airbag occurs, inert gas is generated in the inflator housing and the gas is directed rapidly through a plurality of nozzles formed in the inflator housing and into the airbag to force the airbag out of the reaction can to inflate the airbag.

Some inflators have flangeless bases, many are shorter than the airbag module housing in which they are to be housed, and many have varying outside diameters. In any case, the inflator mounting in the airbag assembly must be secure, durable, squeak and rattle free, cost effective, and must center and support the flangeless type based end of the inflator without the benefit of a flanged base.

Accordingly, it is an object of this invention to provide a new and improved inflator adapter for mounting and retaining an inflator in an airbag module which aids in resisting movements, torque or forces caused by escaping gasses from the inflator or in airbag deployment.

Another object of this invention is to provide a new and improved inflator adapter which will accommodate the mounting of a wide range of inflator diameters in an airbag module housing.

Still another object of this invention is to provide a new inflator adapter which, when installed on the inflator, presents a unified assembly for installation in the final assembly of an airbag module.

Yet another object of this invention is to provide a new inflator adapter having a design simplicity which limits the amount of tooling required for installation of the inflator, as well as final assembly in an airbag module.

BRIEF SUMMARY OF THE INVENTION

In carrying out this invention in one illustrative embodiment thereof, an inflator adapter for mounting a generally cylindrical inflator of an airbag assembly in an airbag module is provided having a hollow cylindrical wall configuration with first and second ends with said second end having an inside diameter slightly larger than the outside diameter of the inflator adapted to be mounted therein. A plurality of internally placed teeth protruding radially and axially inward are located around the inner circumference of the second end of the hollow cylindrical wall of the adapter whereby, when the second end of the adapter is pressed onto the inflator, the internal inwardly facing teeth bite into the exterior of the inflator mounted therein, locking the inflator in the adapter. Mounting means are provided on the first end of the inflator adapter for mounting the adapter in an airbag module.

BRIEF DESCRIPTION OF THE DRAWINGS

The invention together with further objects, features, aspects and advantages thereof, will be more clearly understood from the following description taken in connection with the accompanying drawings.

DETAILED DESCRIPTION OF THE INVENTION

Figure 1:
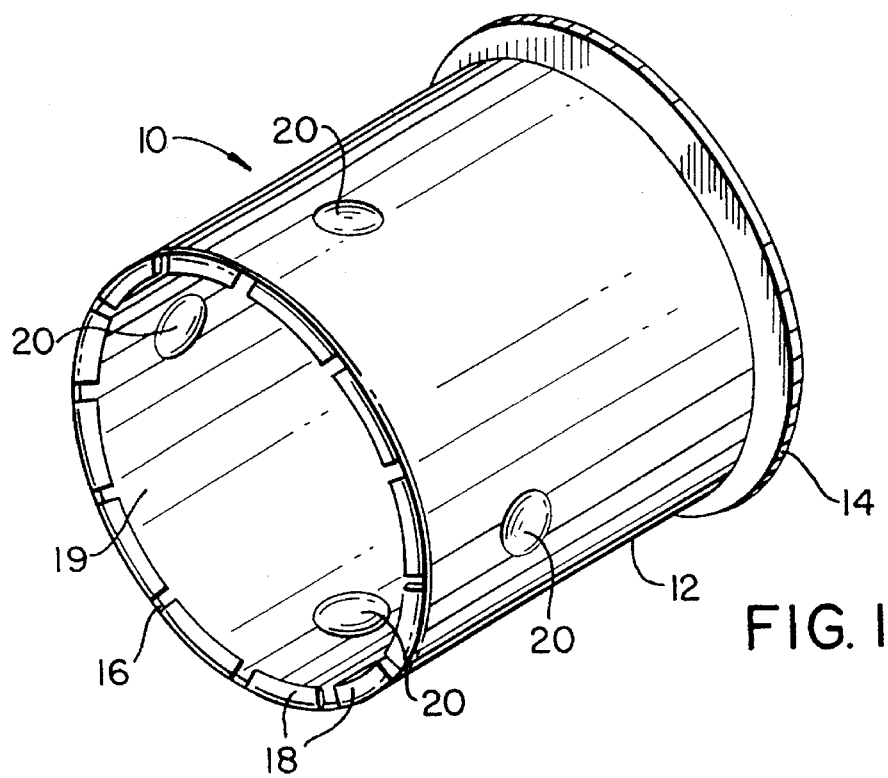
FIG. 1 is a perspective view of an inflator adapter in accordance with the present invention.
Figure 2:
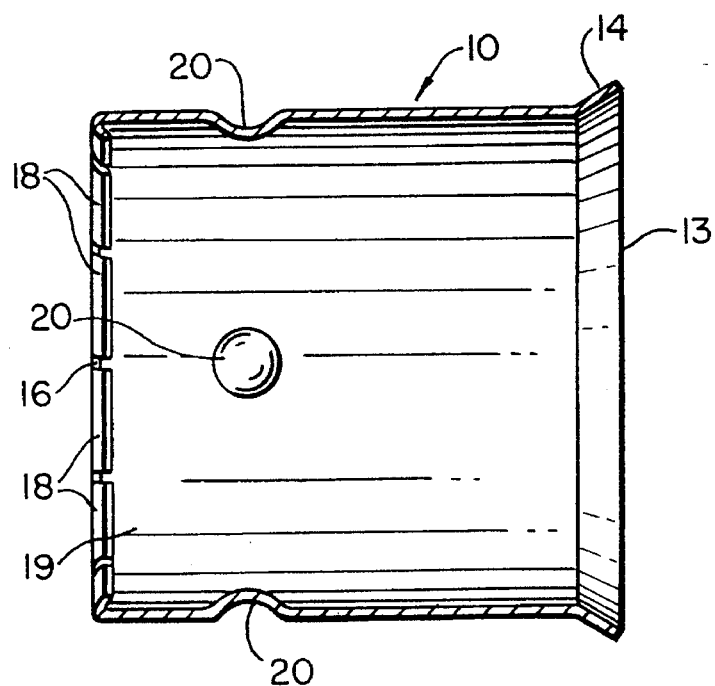
FIG. 2 is a cross-sectional view of the inflator adapter of FIG. 1.

Referring now to FIGS. 1 and 2, an inflator adapter, referred to generally with the reference numeral 10, has a hollow cylindrical or tubular wall housing 12 terminated on one end 13 thereof by a mounting flange 14 and/or any other structure or means as may be appropriate for mounting the adapter 10 in an airbag module housing.

On the other end 16 of the adapter housing 12 opposite the mounting flange 14 are a plurality of internal, inwardly facing teeth 18. The teeth 18 are preferably uniformly spaced around the inner peripheral circumference of the adapter 10 and are formed to assume a backward facing acute angle with the adapter cylindrical housing 12. The purpose of the axially and radially inwardly facing teeth 18 is to wedge or protrude into the exterior wall of an inflator once the adapter is installed, as will be further explained in connection with FIG. 3. It will be appreciated that the inwardly facing teeth 18 need not be located at the external edge of end 16 of cylindrical housing 12 but may be spaced axially inward from the edge of the housing. The cylindrical housing 12 also optionally contains a plurality an inwardly projecting dimples 20 on its inner surface 19 intermediate the edges of ends 13 and 16.

Figure 3:
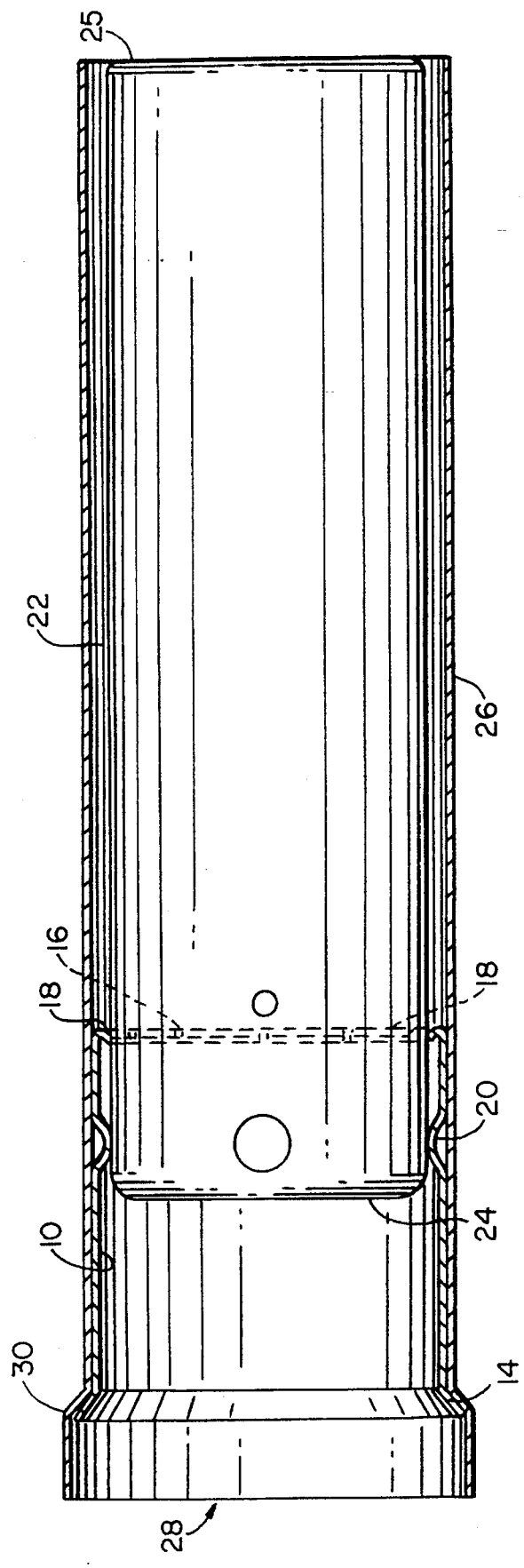
FIG. 3 is a cross-sectional view of an inflator mounted in a portion of an airbag module along the inflator adapter of FIG. 2.

In FIG. 3, a portion of an airbag module housing 26 having a flange 30 thereon with an access opening 28 in an end wall of the housing 26 therein houses an inflator 22 and the inflator adapter 10 in accordance with the present invention. The portion of the module 26 carrying a folded airbag forms no part of the present invention and accordingly is not shown. The same is true for the mounting in the airbag module 26 of the inflator end 25 opposite the flangeless base 24 of the inflator.

In the initial installation, open end 16 of the inflator adapter 10 is positioned over the flangeless base 24 and the outside diameter of the inflator 22. As the adapter 10 is installed on the inflator 22, the ends of the inwardly facing teeth 18 deform and bite into the outer surface of the inflator 22. The dimples 20 which are spaced inwardly with respect to the teeth 18 provide centering stability and additional retention of the inflator 22 in the adapter be. When fully installed the biting teeth 18 produce a locking effect such that the more that the adapter be is pulled away from the inflator 22, the more securely the teeth 18 dig into and engage the exterior diameter of the body of the inflator 22 to prevent relative axial movement.

A significant advantage of the toothed structure of the inflator adapter be is to permit the secure mounting of cylindrical inflators over a wide inflator diameter range in airbag modules. Normal diameter variations within acceptable tolerances in producing inflator assemblies are readily accommodated by the inflator adapter be of the present invention. In addition, the adapter 10 allows installation of inflators into module housings that were originally designed for longer inflators.

The inwardly facing teeth 18 in the adapter 10 provide a one-way locking installation between the adapter be and the inflator 22 and as such may be considered as one assembly after being put together. This is important from a manufacturing standpoint because the adapter 10 does not have to be separately installed at the time of final assembly of the airbag module. The simplicity of the design of the adapter 10 requires a minimum amount of tooling to install the adapter 10 into the inflator 22.

The installed adapter 10 on the inflator 22 is then assembled in the airbag module housing 26 by insertion through the opening 28 in the airbag module housing 26 until the mounting flange 14 contacts the flange 30 of the airbag module housing. The flanges 14 and 30 may be secured together in any suitable manner, such as by welding, soldering, cementing and the like. The mounting flange 14 on the adapter 10 is only one type of structure to facilitate the attachment of the adapter 10 to the airbag module housing 26 and other means such as bevels, mating surfaces and the like, may be employed.

Figure 4:
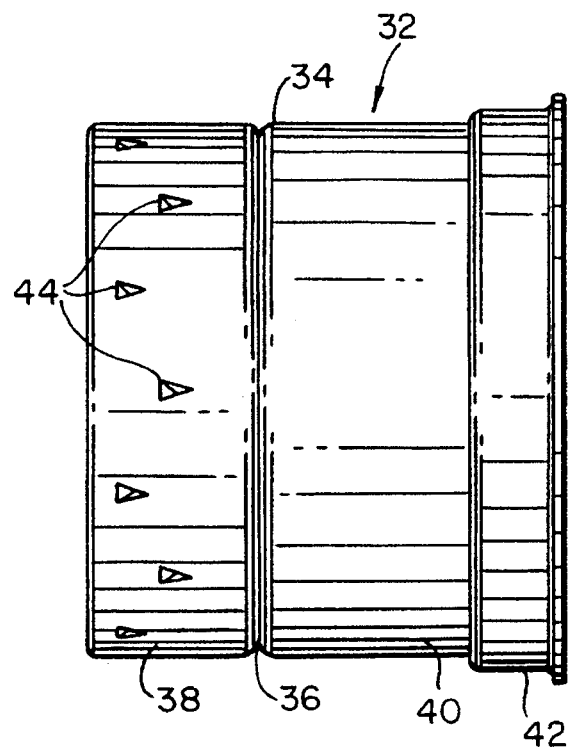
FIG. 4 is a front elevational view of another embodiment of the inflator adapter of this invention.
Figure 5:
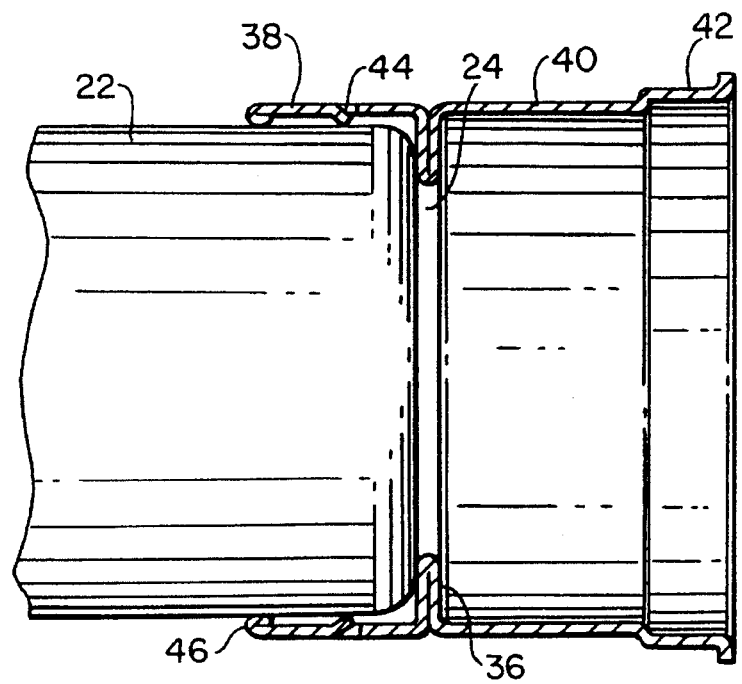
FIG. 5 is a cross-sectional view of the inflator adapter of FIG. 4 showing the adapter mounted on the inflator.

FIGS. 4 and 5 show another embodiment in which an inflator adapter 32 comprises a hollow, bisected cylindrical housing 34 having an internal peripheral rib or separator 36 providing a first end or rear section 38 and a second end or forward section 40 for the cylindrical housing 34. A plurality of internal, axially and radially inwardly protruding teeth 44 are uniformly spaced around the internal circumference of the rear section 38 of the housing 34. The teeth are illustrated as being triangularly shaped with pointed edges but may have other configuration as long as the teeth bite into the inflator 22 when mounted thereon. The inside diameter of the cylindrical housing 34 is slightly larger than the outside diameter of the inflator 22. The forward section 40 is terminated in a mounting flange 42 or any other suitable means to facilitate the attachment of the adapter 32 to the airbag module housing (not shown in FIG. 5). The rear section 38 of the adapter is provided with an internal peripheral bead 46 which functions to bear on an inflator 22 on which the adapter 32 is mounted, thereby sealing the adapter from internal communication with the airbag module. Teeth 44 may be integral with the wall of cylindrical housing 34 and may be formed by puncturing the wall in a suitable manner to form the inwardly projecting teeth.

The adapter 32 functions in a similar manner to the adapter 10 of FIG. 1. The adapter 32 is installed on the inflator 22 until the flangeless base 24 of the inflator contacts the separator 36 of the adapter 32. The separator 36 functions to aid as a stop to limit the depth to which the adapter 32 may be inserted on the inflator 22 and in addition radially strengthens the adapter 32 to provide better stability. The bead 46 bears on the outer perimeter of the inflator 22 to seal the interior of the airbag module housing 34.

As in the prior embodiment, the internal, inwardly facing teeth 44, which form an axially inwardly facing acute angle with the exterior of the inflator 22, bite into the exterior surface of the inflator in rapid fashion, effectively locking the adapter 32 onto the inflator 22.

It will be appreciated that the inflator adapter 10 of FIGS. 1 to 3 may also be provided with an internal peripheral rib or separator similar to element 36 of adapter 32 in order to act as a stop to limit the depth to which adapter 10 may be inserted on inflator 22.

Accordingly, the adapter of the present invention is well suited for adapting cylindrical inflators of constant and varying diameters and lengths for use in airbag modules. The adapter acts as a structural element for providing significant retentive forces on inflator housings and in holding the airbag module together in a firm, squeak and rattle-free manner.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An inflator adapter for mounting a generally cylindrical inflator of an airbag assembly in an airbag module, said inflator adapter comprising:

a hollow cylindrical housing with first and second ends;

mounting means on said first end for mounting said inflator adapter in an airbag module;

said second end having an inside diameter slightly larger than an outside diameter of an inflator which is to be mounted therein; and a plurality of internal, axially inclined and radially inwardly protruding teeth located around a circumference of said second end of said adapter housing whereby when the second end of the adapter housing is pressed on to the inflator the inwardly protruding teeth grip an exterior surface of the inflator mounted therein, locking the inflator in the inflator adapter.

2. The inflator adapter as claimed in claim 1 wherein said inwardly protruding teeth are positioned substantially uniformly around an external edge of said second end of said inflator adapter housing.

3. The inflator adapter as claimed in claim 2 wherein said housing has a plurality of dimples spaced internally around the inside diameter of said second end of said inflator adapter housing and spaced axially inward from said inwardly protruding teeth.

4. The inflator adapter as claimed in claim 1 wherein said hollow cylindrical inflator adapter housing is radially bisected between said first and second ends of said adapter housing by an internal separator on an inside circumference of said cylindrical adapter housing, said separator functioning to limit a depth to which the second end of the inflator adapter housing may be inserted on the inflator.

5. The inflator adapter as claimed in claim 4, wherein said inwardly protruding teeth are substantially uniformly spaced around a periphery edge of said second end of said inflator adapter housing.

6. The inflator adapter as claimed in claim 5 wherein said teeth are rectangularly shaped.

7. The inflator adapter as claimed in claim 1 having an internal circumferential bead on an outer peripheral edge of said second end.

8. The inflator adapter as claimed in claim 1 wherein said teeth are triangularly shaped pointed teeth.

9. The inflator adapter as claimed in claim 1 wherein said mounting means comprises a flange on said first end of said cylindrical adapter housing.

10. An airbag restraint inflator assembly comprising:

an airbag module having an access opening in a first end wall of said airbag module, said access opening receiving and positioning an inflator and inflator adapter within a cavity of said airbag module;

said inflator, shorter in dimension than said airbag module in which said inflator is mounted, said inflator having a generally cylindrically shaped housing with a flangeless base;

said inflator adapter having a hollow, tubular configuration with an inside diameter slightly larger than an outside diameter of said inflator on which said inflator adapter is mounted;

a plurality of internal, axially inclined and radially inwardly protruding teeth located around a circumference on one end of said inflator adapter, which teeth grip an exterior surface of said inflator locking said inflator adapter on said inflator; and means for mounting said inflator adapter with said inflator carried thereby in said access opening of said airbag module.

11. An airbag restraint inflator assembly comprising:

an airbag module having an access opening in an end wall of said airbag module, said access opening receiving and positioning an inflator and inflator adapter within a cavity of said airbag module;

said inflator being generally cylindrically shaped with a flangeless base;

said inflator adapter having a hollow, tubular housing having first and second ends with an inside diameter slightly larger than an outside diameter of said inflator on which said inflator adapter is mounted and a plurality of internal, axially inclined and radially inwardly protruding teeth located circumferentially around said second end of said housing, which teeth grip an exterior surface of said inflator locking said inflator adapter on said inflator; and means on said first end of said housing for mounting said inflator adapter with said inflator carried thereby in said access opening of said airbag module.

12. An airbag restraint-inflator assembly as claimed in claim 11 wherein said inwardly protruding teeth are positioned substantially uniformly around the circumference on said second end of said inflator adapter.

13. An airbag restraint-inflator assembly as claimed in claim 12 wherein said housing has a plurality of dimples spaced internally around the inside diameter of said second end of said inflator adapter housing and spaced axially inward from said inwardly protruding teeth.

14. An airbag restraints inflator assembly as claimed in claim 11 wherein said hollow tubular inflator adapter is radially bisected between said first and second ends of said inflator adapter by an internal separator on the inside diameter of said hollow tubular configuration, said separator functioning to limit the depth to which the second end of the inflator adapter housing may be inserted on the inflator.

15. An airbag restraint-inflator assembly as claimed in claim 14 wherein said inwardly protruding teeth are substantially uniformly spaced around a periphery edge of said second end of said inflator adapter housing.

16. An airbag restraint-inflator assembly as claimed in claim 15 wherein said teeth are rectangularly shaped.

17. An airbag restraint-inflator assembly as claimed in claim 11 having an internal circumferential bead on an outer peripheral edge of said second end.

18. An airbag restraint-inflator assembly as claimed in claim 11 wherein said teeth are triangularly shaped pointed teeth.

19. An airbag restraint-inflator assembly as claimed in claim 11 wherein said mounting means comprises a flange on said first end of said cylindrical adapter housing.

20. An inflator adapter for mounting a generally cylindrical shaped airbag inflator having a flangeless base in an airbag module and wherein said inflator is shorter in dimension than said airbag module, said inflator adapter comprising:

a hollow, tubular cylindrical housing with first and second ends;

flange means on said first end for mounting said inflator adapter in an airbag module;

said first and second ends having an inside diameter slightly larger than an outside diameter of an inflator which is to be mounted therein;

a plurality of internal, axially inclined and radially inwardly protruding teeth located around a circumference of a peripheral edge of said second end of said housing whereby when the second end of said inflator adapter housing is inserted on the inflator, the inwardly protruding teeth grip an exterior surface of said inflator mounted therein locking the inflator in the inflator adapter; and said hollow, tubular cylindrical housing having a plurality of inwardly facing dimples spaced internally around the inside diameter of said inflator adapter housing and spaced axially inward from said inwardly protruding teeth.

* * * * *

UNITED STATES PATENT AND TRADEMARK OFFICE
CERTIFICATE OF CORRECTION

PATENT NO. : 5,498,029
DATED : 12 March 1996
INVENTOR(S) : G. Dean Mossi et al.

It is certified that error appears in the above-indentified patent and that said Letters Patent is hereby corrected as shown below:

At column 2, line 62, "adapter be." should be --adapter 10.--.

At column 2, line 64, "adapter be" should be --adapter 10--.

At column 3, line 2, "adapter be" should be --adapter 10--.

At column 3, line 6, "adapter be" should be --adapter 10--.

At column 3, line 11, "adapter be" should be --adapter 10--.

At column 6, line 1, "restraints inflator" should be --restraint-inflator--.

Signed and Sealed this

Sixth Day of August, 1996

Attest:

BRUCE LEHMAN

Attesting Officer    Commissioner of Patents and Trademarks